(12) United States Patent
Iizumi et al.

(10) Patent No.: US 11,892,685 B2
(45) Date of Patent: Feb. 6, 2024

(54) FIBER OPTIC ADAPTER

(71) Applicant: Senko Advanced Components, Inc., Marlborough, MA (US)

(72) Inventors: Kenji Iizumi, Tokyo (JP); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 62 days.

(21) Appl. No.: 17/482,337

(22) Filed: Sep. 22, 2021

(65) Prior Publication Data

US 2022/0091344 A1 Mar. 24, 2022

Related U.S. Application Data

(60) Provisional application No. 63/082,403, filed on Sep. 23, 2020.

(51) Int. Cl.
*G02B 6/38* (2006.01)

(52) U.S. Cl.
CPC .......... *G02B 6/3825* (2013.01); *G02B 6/3849* (2013.01)

(58) Field of Classification Search
CPC .......... G02B 2006/4297; G02B 6/3825; G02B 6/3849
See application file for complete search history.

(56) References Cited

U.S. PATENT DOCUMENTS

| | | | |
|---|---|---|---|
| 6,361,218 B1 | 3/2002 | Matasek et al. | |
| 6,561,699 B1 | 5/2003 | De Marchi | |
| 7,315,682 B1 | 1/2008 | En Lin | |
| 9,933,586 B1 * | 4/2018 | Yang | G02B 6/3825 |
| 10,451,812 B2 * | 10/2019 | Verheyden | G02B 6/3849 |
| 10,802,224 B2 | 10/2020 | Wong | |
| 11,029,470 B2 | 6/2021 | Wong | |
| 2004/0141693 A1 | 7/2004 | Szilagyi et al. | |
| 2011/0038581 A1 | 2/2011 | Mudd et al. | |
| 2011/0317976 A1 * | 12/2011 | Eckstein | G02B 6/3879 385/139 |
| 2019/0331860 A1 | 10/2019 | Yang | |
| 2020/0218015 A1 | 7/2020 | Ho | |
| 2021/0247572 A1 | 8/2021 | Ho | |

FOREIGN PATENT DOCUMENTS

WO 2014057265 A2 4/2014

OTHER PUBLICATIONS

International Search Report and Written Opinion, Application No. PCT/US21/051625, dated Dec. 31, 2021, pp. 11.

* cited by examiner

*Primary Examiner* — Omar R Rojas (57) ABSTRACT

The fiber optic adapter according to the present disclosure may include an adapter housing defining a channel to receive a fiber optic connector having one or more ferrules, and a first shutter and a second shutter attached to opposing sidewalls of the adapter housing. Each of the first and second shutters have a first member and a second member. The first member is configured to extend into the channel. the first members of the first and second shutters are sized and shaped to cooperatively close the channel. At least one of the first member is resiliently movable upon insertion of the fiber optic connector into the channel to open the channel. The fiber optic adapter may prevent the entry of the dust and other debris.

19 Claims, 13 Drawing Sheets

FIBER OPTIC ADAPTER

CROSS-REFERENCE TO RELATED APPLICATIONS

The present invention claims priority to U.S. Provisional Patent Application No. 63/082,403 filed on Sep. 23, 2020, the disclosure of which is incorporated hereby by reference in its entirety.

FIELD OF THE INVENTION

The present invention generally relates to optical adapters configured to receive one or more fiber optic connectors in general and, more particularly, to fiber optic adapters with a dust shutter for protecting against ingress of dust and other debris when a connector is not inserted within the adapter.

BACKGROUND

Optical adapter can receive optical connectors to create the optical transmission path. However, the channels within the adapters are susceptible to dust and other debris collecting in the channel and negatively affecting light transmission. In addition, light emitted from an uncovered connector can damage user's eyes when installing or repairing a fiber optic system.

U.S. Pat. No. 6,561,699B1, "Plug Part of an Optical Plug-And-Socket Connection", issued May 13, 2003, to Inventor De Marche, in FIG. 15 discloses a shutter plate is configured to cover the port opening with a bias spring that increases the adapter overall size.

SUMMARY

In one aspect of the present invention, the fiber optic adapter may include an adapter housing defining a channel to receive a fiber optic connector having one or more ferrules, and a first shutter and a second shutter attached to opposing sidewalls of the adapter housing. Each of the first and second shutters have a first member and a second member. The first member is configured to extend into the channel. the first members of the first and second shutters are sized and shaped to cooperatively close the channel. At least one of the first members is resiliently movable upon insertion of the fiber optic connector into the channel to open the channel. The fiber optic adapter may prevent the entry of the dust and other debris.

In another aspect of the present invention, the fiber optic adapter may comprise an adapter housing comprising a top wall, a bottom wall, and sidewalls, and at least one partition wall defining a plurality of channels, and a first shutter and a second shutter attached to opposing ones of the sidewalls and partition walls of the adapter housing in each channel. Each of the first and second shutters have a first member and a second member. The first member is configured to extend into one of the plurality of channels.

The fiber optic adapter according to the present invention may further include a central shutter pair that extends into the adjacent channels of the plurality of channels.

BRIEF DESCRIPTION OF THE DRAWINGS

The present invention will become more fully understood from the detailed description given hereinbelow and the accompanying drawings, which are given by illustration only, and thus are not limitative of the present disclosure, and wherein.

DETAILED DESCRIPTION

This disclosure is not limited to any particular system, device and method described, as these may vary. The terminology used in the description is for the purpose of describing the versions or embodiments only and is not intended to limit the scope.

The following terms shall have, for the purposes of this application, the respective meanings set forth below. A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, an MPO connector, or a straight tip (ST) connector. The connector may generally be defined by a connector housing body. In some embodiments, the housing body may incorporate any or all the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable. As used herein, the term "optical fiber" is intended to apply to all types of single mode and multi-mode light waveguides, including one or more bare optical fibers, coated optical fibers, loose-tube optical fibers, tight-buffered optical fibers, ribboned optical fibers, bend performance optical fibers, bend insensitive optical fibers, nanostructured optical fibers, or any other expedient for transmitting light signals.

Figure 1:
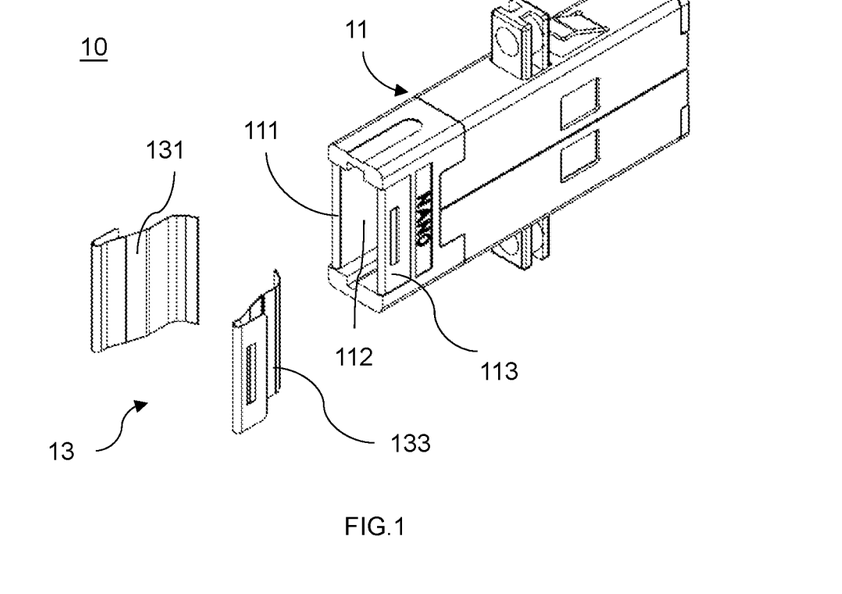
FIG. 1 is an exploded perspective view of the adapter in accordance with an embodiment of the present disclosure.

Referring to FIG. 1, the adapter 10 may include an adapter housing 11 and a pair of shutters 13. The adapter housing 11 includes a first sidewall 111, second sidewall 113, top and bottom walls defining a channel 112 to receive a fiber optic connector therein. The fiber optic connector may accommodate one or more optical fibers. The pair of the shutters 13 may be attached to the opposing sidewalls 111, 113 of the adapter housing 11 to close or cover the opening of the channel 112 such that the entering of water or dust is prevented.

Figure 2:
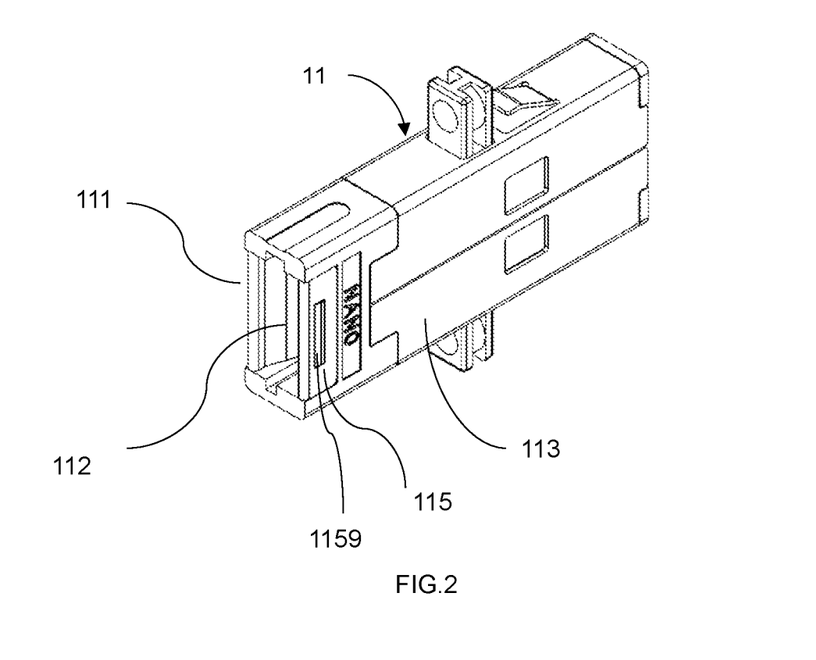
FIG. 2 is a perspective view of adapter housing of FIG. 1, FIGS. 3A and 3B are enlarged perspective views of the shutter of FIG. 1.

FIG. 2 shows the adapter housing of FIG. 1 with shutters removed. Each of the opposing sidewalls 111 and 113 is provided with a receiving portion 115 that is recessed to receive a part of the shutter.

Figure 3A:
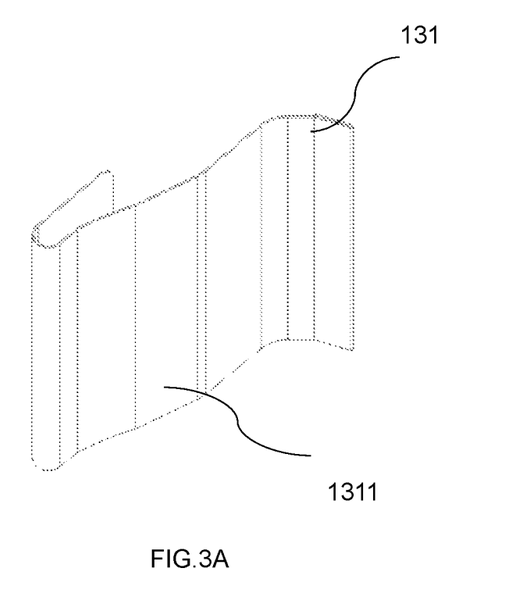
Figure 3B:
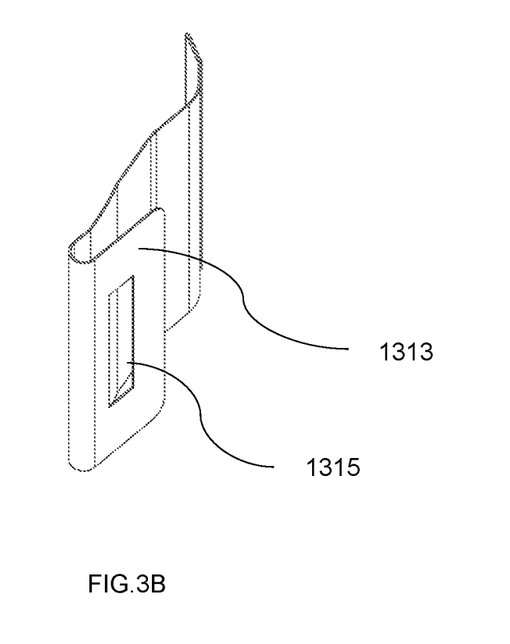

FIGS. 3A and 3B show the shutter of FIG. 1. The pair of shutters 13 may include a first shutter 131 and a second shutter 133. The first shutter 131 may include a first member 1311 and second member 1313. A space is formed between the first member 1311 and second member 1313 such that the sidewall 111 or 113 is received in the space. The first member 1311 is configured to extend into the channel 112 and sized to close part of the channel 112 such that the first members of the first shutter 131 and second shutter 133 may cooperate to close the opening of the channel 112 through their contact with each other.

Thus, the channel 112 is sealed from the dust and debris. The second member 1313 may extend outside of the adapter housing 11 and may be received within the receiving portion 115 such that the movement of the shutter is prevented. As shown in FIG. 3B, the second member 1313 is provided with a cutout 1315 to cooperate with a protrusion 1159 (as shown in FIG. 2) on the adapter housing 11 to secure the shutter. In the illustrated embodiments, the first and second shutters 131, 133 are made of an elastically resilient material. The second member 1313 is deformed slightly as it is placed onto the adapter housing 11. As a result, the bias of the second member 1313 induced by this deformation assists in holding the protrusion within the cutout 1315.

In this example, the first member 1311 and second member 1313 may have different lengths, and the first member 1311 is longer than the second member 1313. The first member 1311 is formed with a shaped, non-planar surface and includes one or more arc sections. The arc sections may have different radius and may be made by various of means. For example, the shaped, non-planar surface may have multiple bends defining multiple arc sections. The shutter 131 is made of elastically resilient material and will deform resiliently under pressure. For example, the shutter is made from a flexible sheet metal, e.g., spring sheet metal. The second shutter 133 may have similar structure and material as first shutter 131, however, the second shutter 133 may have a different length of the first member 1311 than that of the first shutter 131. The first member of the second shutter will be designated by reference numeral 1331.

Figure 4A:
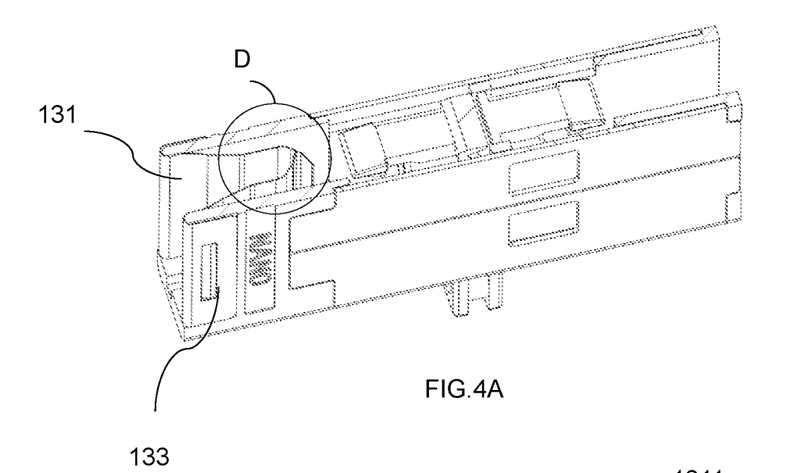
FIG. 4A is a perspective view of the adapter of FIG. 1 with a top wall of the adapter broken away to show internal construction.
Figure 4B:
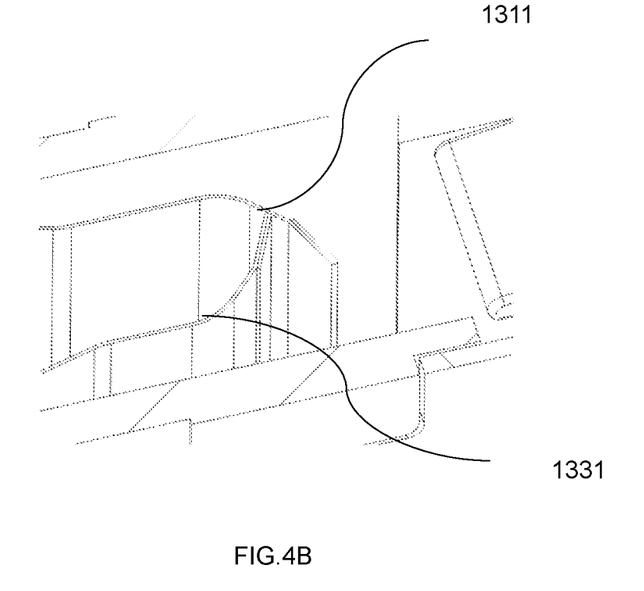
FIG. 4B is an enlarged detailed view of part taken as indicated by circle D of FIG. 4A, FIGS. 5A, 5B and 5C are top plan views of the adapter FIG. 4A showing the process of the insertion of a connector including LC ferrule.

FIGS. 4A and 4B show cross-section views of the adapter of FIG. 1. The first and second shutters 131, 133 are attached to the opposing sidewalls 111, 113 of the adapter housing 11, respectively. In detail, first sidewall 111 is received in the space between the first and second members 1311, 1313 of the shutters 131 and is sandwiched between the first and second members. The first member may have sufficient length such that the first members 1311, 1331 of the first and second shutters 131, 133 may contact each other and the opening of the channel 112 is closed by the first members. Thus, the entry of water or dust is prevented. In this example, the first members 1311 and 1331 are shown with different lengths such that the first member 1311 may extend beyond the contact point with the first member 1331 to provide extra protection. In other words, the first member 1311 extends past and over the free end of the first member 1331. However, they may have the same length. In the illustrated embodiment, the free ends of the first members 1311 and 1331 are folded back upon themselves. This construction provides smooth leading surfaces on the shutters 131, 133 so that the shutters are able to close easily and open without binding.

Figure 5A:
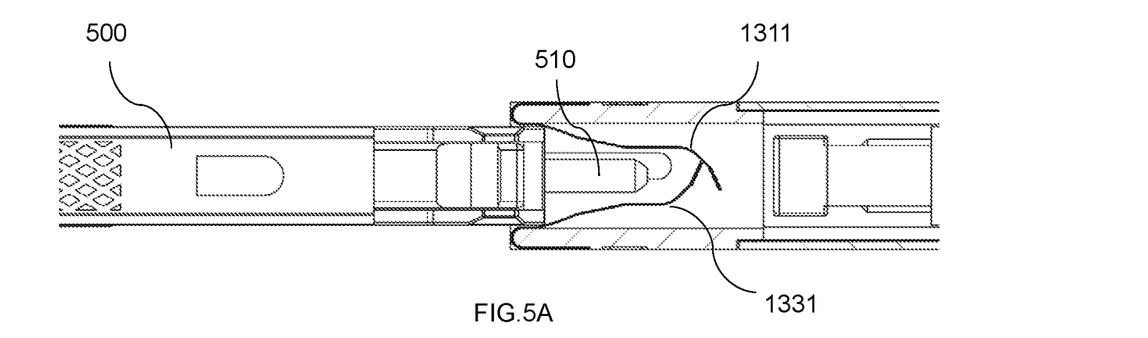
Figure 5B:
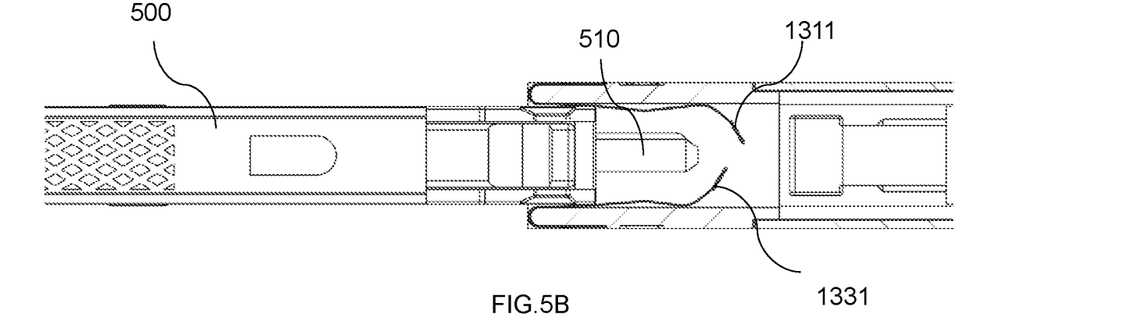
Figure 5C:
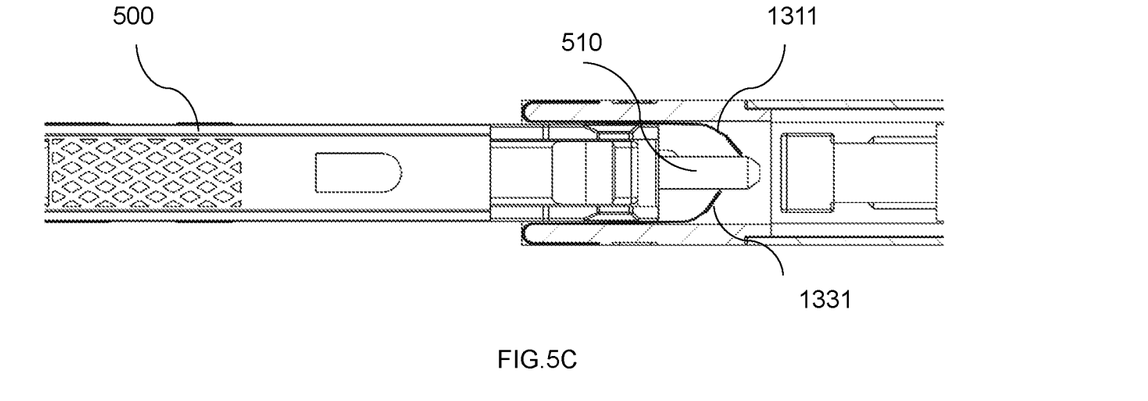

The insertion of the fiber optic connector including a LC ferrule is shown in FIGS. 5A, 5B and 5C. The fiber optic connector 500 includes a ferrule 510. In FIG. 5A, the connector 500 begins to be inserted into the adapter 10, and the channel 112 is closed by first members of the pair of the shutters 13. In FIG. 5B, as the connector 500 moves forward, the connector 500 may press against the arc section of the first member such that the first members 1311, 1331 are forced to move in a direction to open the channel 112. The arc section(s) of the first member is formed to activate the movement of the first member under pressure, e.g., the first member may move in a direction to open the channel. A slit is formed between the free ends of the first members 1311 and 1331 to allow the insertion of the connector 500. The size of the slit is bigger than the diameter of the end face of the ferrule 510 but smaller than the diameter of the body of the ferrule 510. In this example, the connector 500 is shown to include one ferrule 510, however, the skilled in the art shall appreciate that the slit may be formed to permit the insertion of the connector including two ferrules.

In this way, the free ends of the first members 1311, 1331 do not touch the end face of the ferrule 510. In FIG. 5C, first members 1311 and 1331 are pressed against the inner walls of the adapter housing and their tips contact the peripheral surface of the ferrule 510. To prevent the tip of the first member contacts the end face of ferrule, the arc surface of the first member may include a plurality of arc sections. Each arc section may have same or different curvatures. The first members 1311 and 1331 may restore to undeformed status and contact with each other after the connector 500 is removed from the adapter.

Figure 6A:
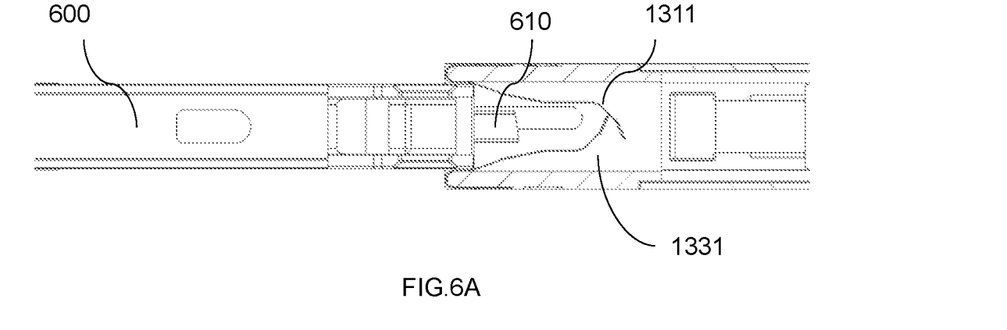
FIGS. 6A, 6B and 6C are top plan views similar to FIGS. 5A, 5B and 5C showing the process of the insertion of a connector including MT ferrule.
Figure 6B:
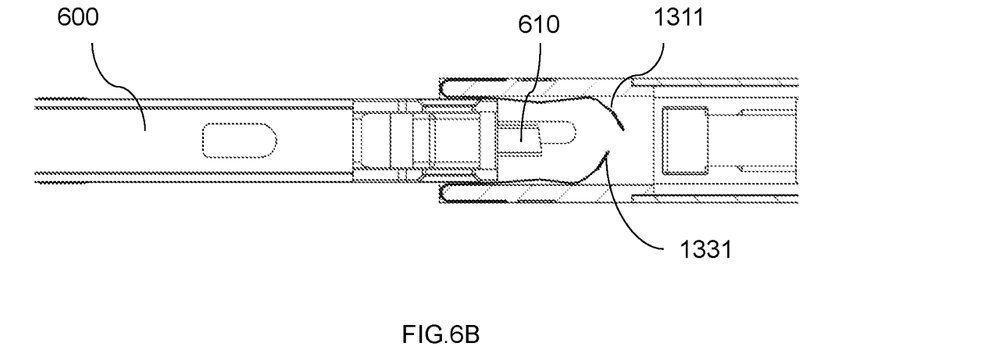
Figure 6C:
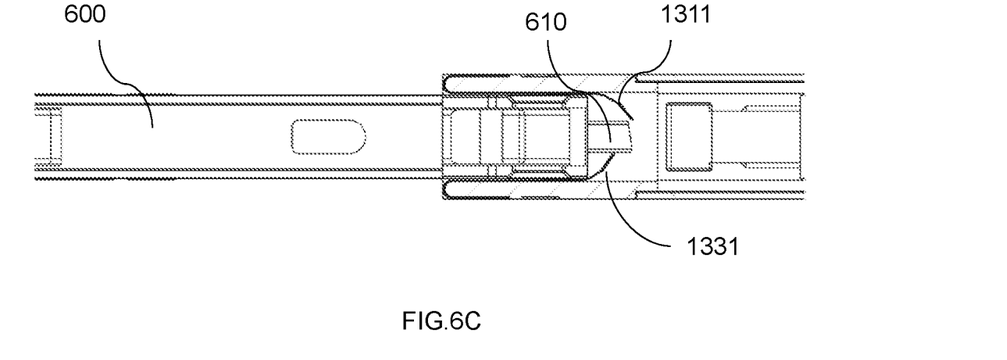

FIGS. 6A, 6B and 6C show the insertion of another type of fiber optic connector including a different type of ferrule into the adapter. The connector 600 includes a MT ferrule 610, in particular the connector 600 is APC (Angled Physical Contact) connector. Before insertion of the connector 600, the channel of the adapter is closed by the pair of shutters 131, 133. As the connector 600 moves forward, the first members 1311, 1331 are pressed by the connector 600 and the tips of the first members touch the peripheral surface 630 of the ferrule without touching the end face of the ferrule 610. The free ends then move along the peripheral surface of the ferrule 610 until the connector 600 reaches to its position.

Figure 7:
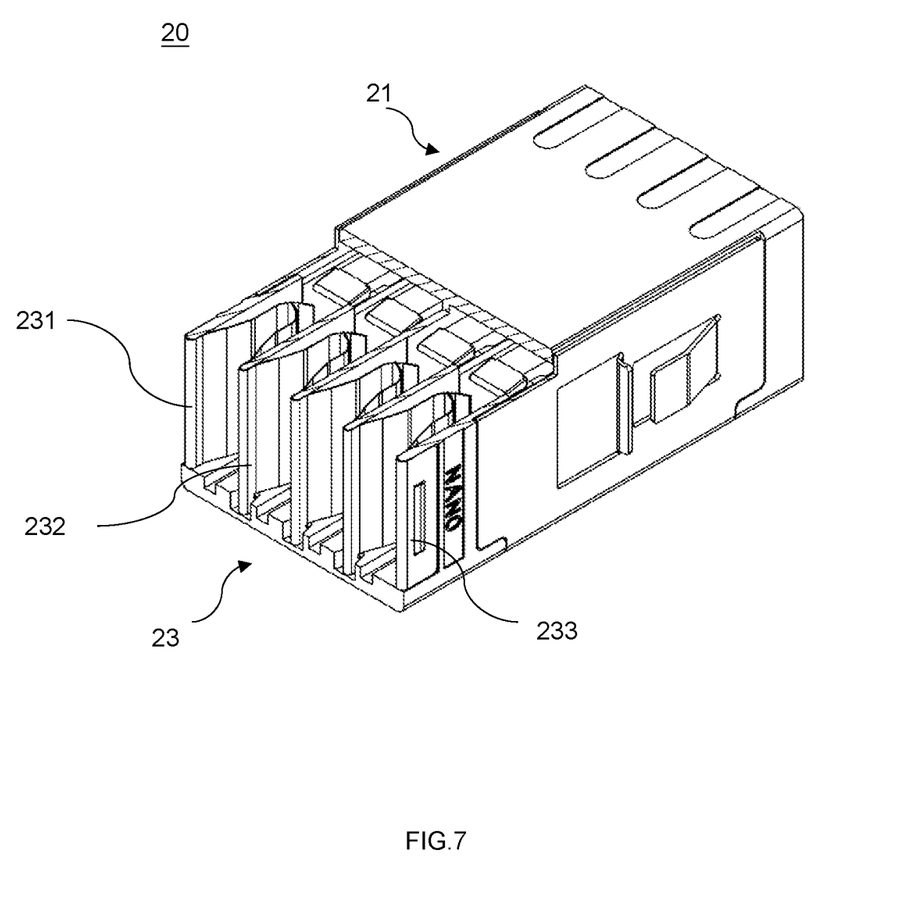
FIG. 7 is a perspective view of a quad adapter in accordance with another embodiment of the present disclosure, having a forward portion of a top wall removed to show the internal construction.

The adapter may have more than one channel, for example, the adapter may have two channels or four channels. FIG. 7 shows an adapter in accordance with another embodiment of the present disclosure. The adapter 20 is provided with four channels which are closed by multiple shutters 23. The multiple shutters 23 are attached to the adapter housing 21. A portion of the adapter is broken away for illustrative purpose only.

The multiple shutters 23 may include a first shutter 231, a second shutter 233 and central shutter pairs 232. The first shutter 231 and second shutter 233 may have similar or same structure of the shutters as depicted in FIGS. 3A and 3B. The central shutter pair 232 may include a first arm and a second arm. Both first and second arms are formed out of a single piece of material and include one or more arc sections.

Figure 8A:
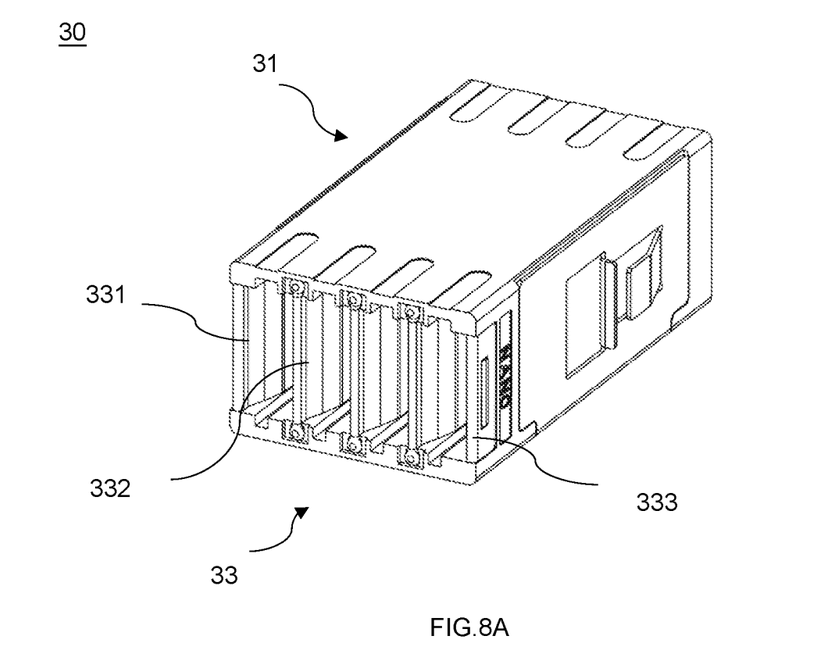
FIG. 8A is a perspective view of a quad adapter in accordance with another embodiment of the present disclosure.
Figure 8B:
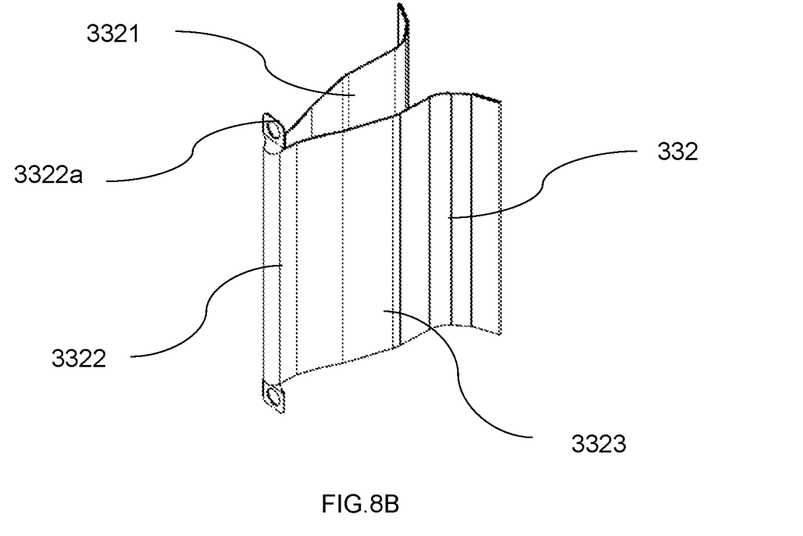
FIG. 8B is a perspective view of a shutter pair of FIG. 8A, FIGS. 8C and 8D are enlarged, fragmentary views of the adapter of FIG. 8A.

FIG. 8A-8D show an adapter in accordance with another embodiment of the present disclosure, similar to FIG. 7. The adapter 30 is provided with four channels which are closed by multiple shutters 33 attached to the adapter housing 31. The multiple shutters 33 may include a first shutter 331, a second shutter 333 and central shutter pairs 332. The first and second shutters may have similar or same structure as depicted in FIGS. 3A and 3B. The adapter 30 may include a plurality of central shutter pairs 332. Three central shutter pairs 332 are shown in FIG. 8A. However, those skilled in the art shall understand that the number of the central shutter pairs is determined by the number of the channels. The central shutter pair 332 may include a first arm 3321, a second arm 3323 and a link element 3322 connecting the first arm and second arm. Each end of the link element in the length direction is provided with a tab 3322a. The tab 3322a may include a hole to secure one of the central shutter pairs 332 to the adapter housing 31.

Figure 8C:
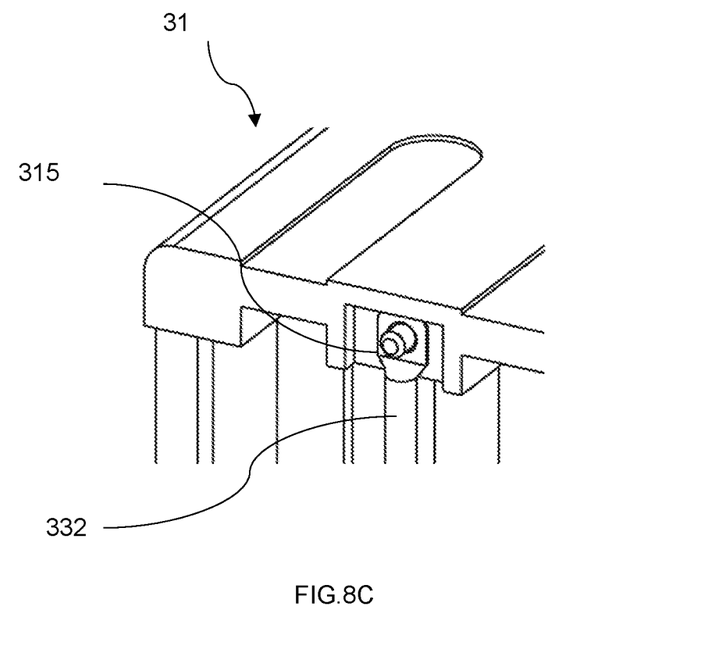
Figure 8D:
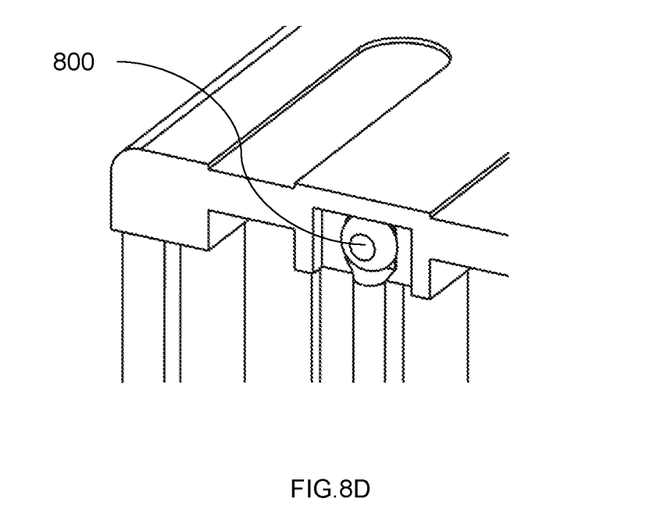

As with the embodiment of FIG. 7, each central shutter pair is formed from a single piece of material (e.g., sheet metal). As attached to the adapter housing 31, the central shutter pair has its first arm 3321 in one of the channels, and its second arm 3323 in a second, adjacent one of the channels. The first arm 3321 cooperates with either the second arm 3323 of another of the central shutter pairs 332, or with one of the first and second shutters 331, 333 to close a respective one of the channels of the adapter housing 31. The adapter housing 31 is also provided with a securing portion 315 as shown in FIG. 8C. The securing portion may be a post or rivet. For example, the post may be threaded. A cap 800 (as shown in FIG. 8D) is attached to the securing means 315 after the central shutter pair 332 is placed into the position to the adapter housing 31 to secure the central shutter pair 332 to the adapter housing.

Figure 9:
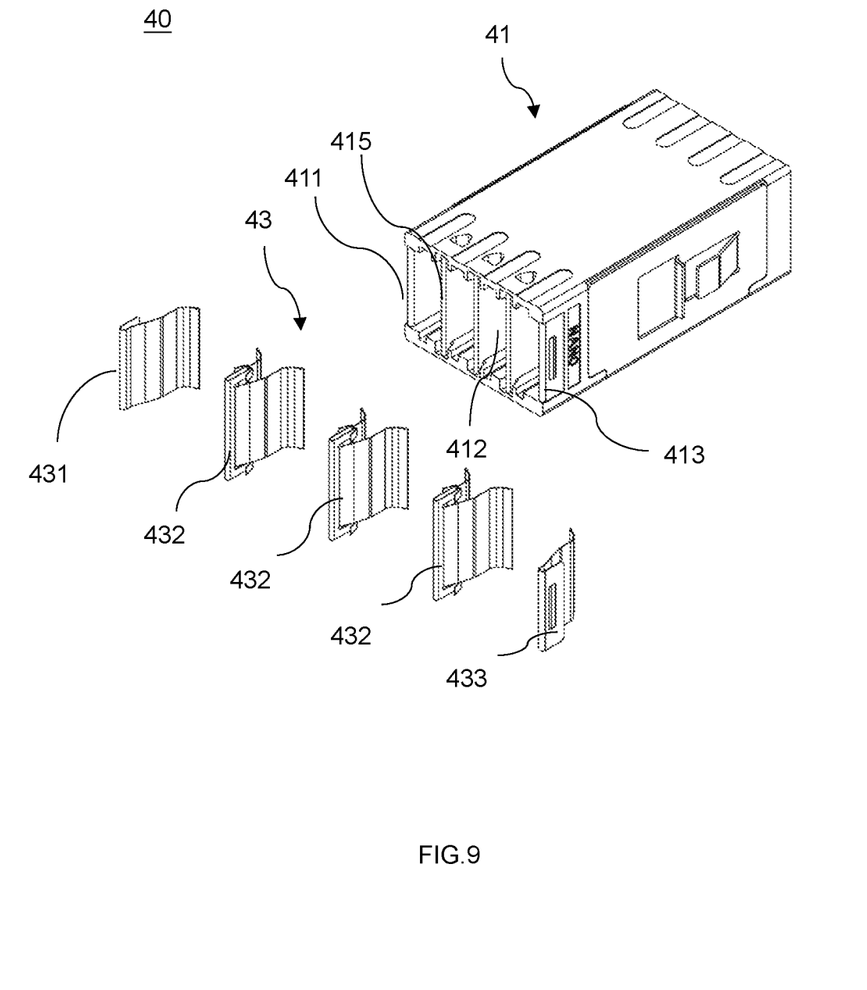
FIG. 9 is an exploded perspective view of a quad adapter in accordance with yet another embodiment of the present disclosure.

FIG. 9 shows an exploded view of an adapter in accordance with yet another embodiment of the present disclosure. The adapter 4 may include an adapter housing 41 and multiple shutters 43. The adapter housing 41 may include left-side wall 411 and right-side wall 413 and define four channels 412 which are divided by partition walls 415. The multiple shutters 43 may include the first shutter 431 and second shutter 433 as discussed in FIGS. 3A and 3B above, and further include three central shutter pairs 432. The central shutter pair 432 is configured to be attached to the partition wall 415. In this example, the shutter 431 and central shutter pair 432 or two central shutter pairs 432 together may cooperate to close the opening of the channel 412. The details are explained in below.

Figure 10:
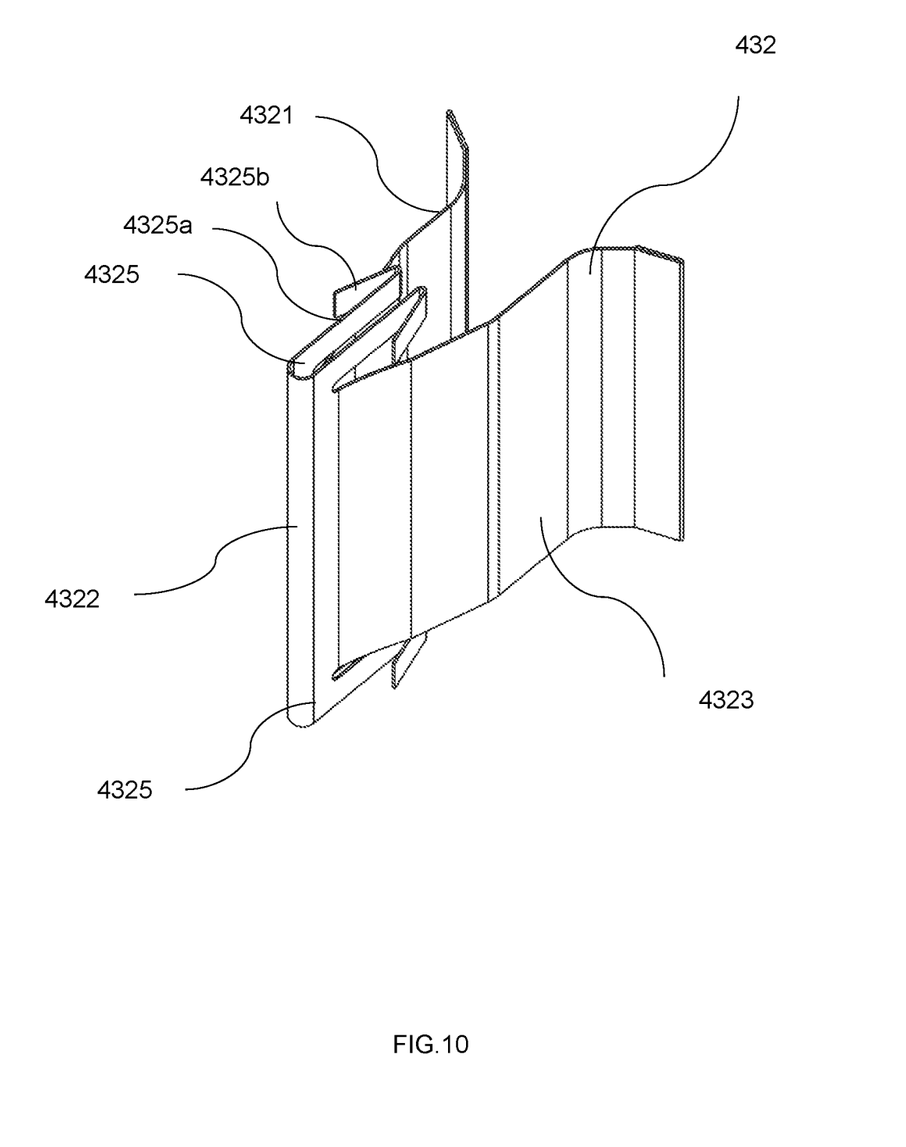
FIG. 10 is a perspective view of a shutter pair of FIG. 9.

FIG. 10 shows the central shutter of FIG. 9. The central shutter pair 432 may include a first arm 4321, second arm 4323, and a link element 4322 connecting the first arm and second arm. The link element 4322 is formed as a U-shape and may receive the partition wall 415 therein. The first arm 4321 is formed with one or more arc sections. Each of the arc sections may have different radius and smoothly connect with each other. The second arm 4322 may have a mirror shape of the first arm 4321 but may have different length at tip portion to create an overlap when two central shutter pairs 432 cooperate to close the opening of the channel 412. The shutters 43 can be made from flexible sheet metal. However, those skilled in the art shall understand that the shutters can be made of other materials that are resiliently deformable. As the connector move forwards within the channel, the shutters may move in a direction to open the channel to allow the insertion of the connector into the channel.

The central shutter pair 432 is provided with a clip 4325 on each end of the link element 4322 for attaching the central shutter pair 432 to the adapter housing 41. The clip 4325 may extend from the link element 4322 and is provided with a main body 4325a and two wings 4325b. The main body 4325a is formed as a U shape and forms an angle with each wing 4325b. The clip 4325 may secure the central shutter pair 432 to the adapter housing 41 and hold it in position to prevent the central shutter pair 432 getting out of the adapter housing 41.

Figure 11A:
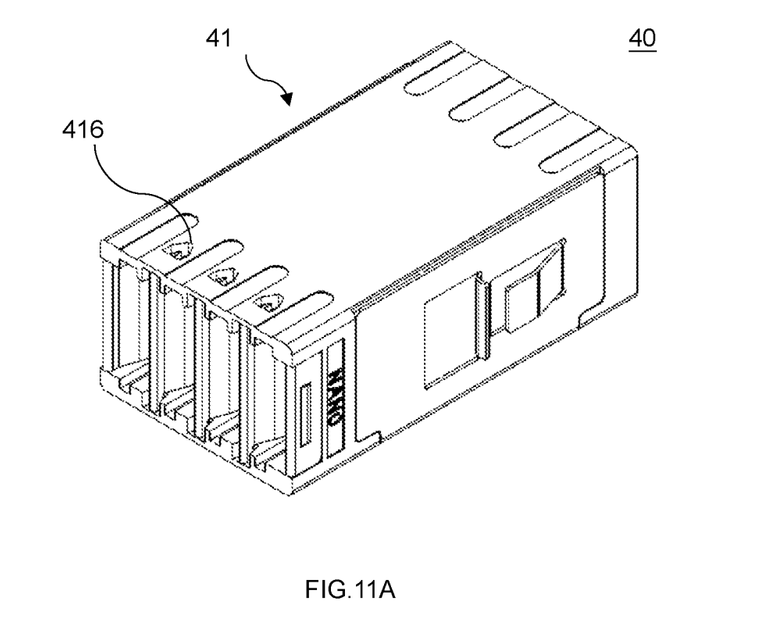
FIG. 11A is a perspective view of the adapter of FIG. 9.
Figure 11B:
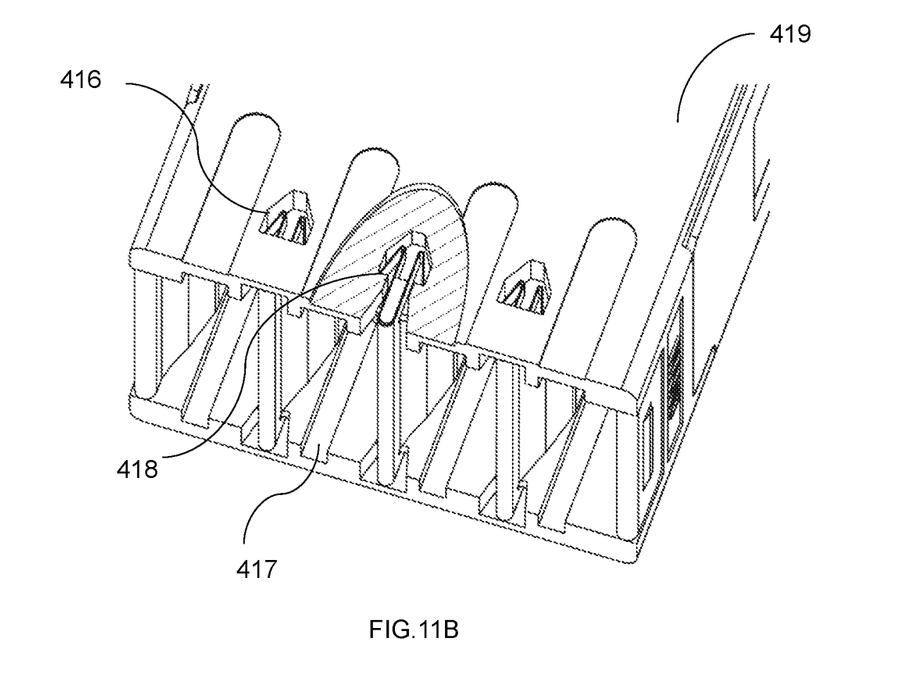
FIG. 11B is an enlarged, fragmentary view of FIG. 11A with a part broken away to show the details of the construction.

FIGS. 11A and 11B show the adapter of FIG. 9. The top wall 419 of the adapter housing 41 is provided with windows 416. The number of the window may correspond to the number of the partition wall. The window 416 may include a stop portion 418 to prevent the central shutter pair 432 withdrawing from the adapter housing 41. In detail, the stop portion is configured to prevent the movement of the wings 4325b in the direction of removing the connector from the adapter 40. The user may oversee the attachment of the central shutter pair 432 through the window 416 and check whether the central shutter pair 432 is placed into position. The partition wall 415 is sandwiched between the first arm 4321 and second arm 4323. The adapter housing 41 may also include keyways 417 in each channel to guide the insertion of the connector. The adapter 40 may also include a top plate (not shown) to cover the top wall 419 to make the windows 416 invisible for an aesthetic appearance.

Figure 12A:
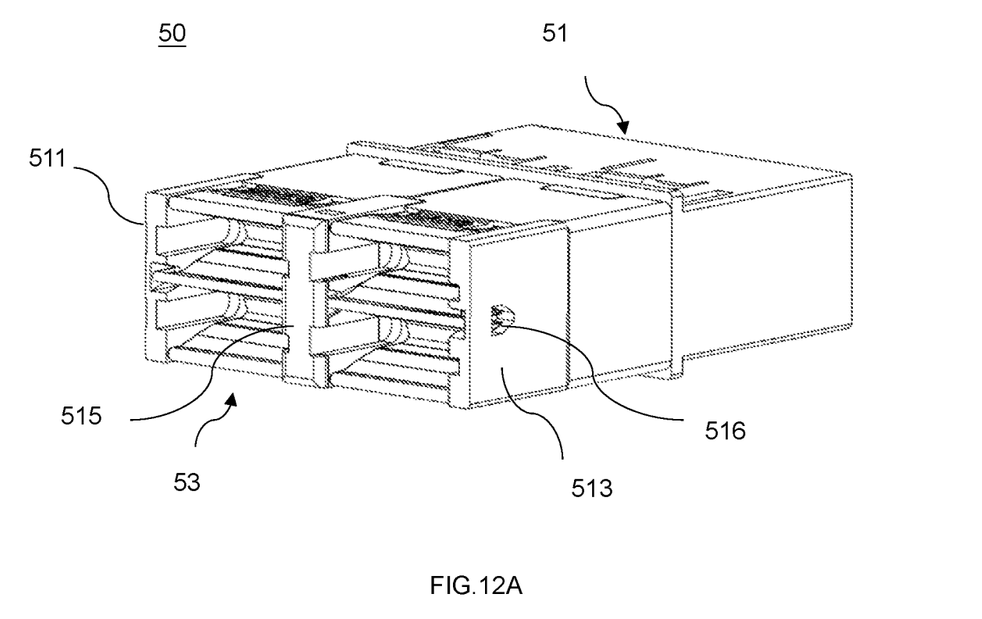
FIG. 12A is a perspective view of a quad adapter in accordance with yet another embodiment of the present disclosure.

FIG. 12A shows another embodiment of the adapter. The adapter 50 may include adapter housing 51 and multiple shutters 53. The adapter housing 51 may include four channels that are arranged as 2×2 array. In this example, two channels are stacked above another two channels. The adapter 50 may include a fixing member 515 that can be attached to the center of the adapter housing 51 to separate the channels. Each sidewall 511, 513 of the adapter housing 51 is provided with a window 516 to ensure the installation of the central shutter pair 532.

Figure 12B:
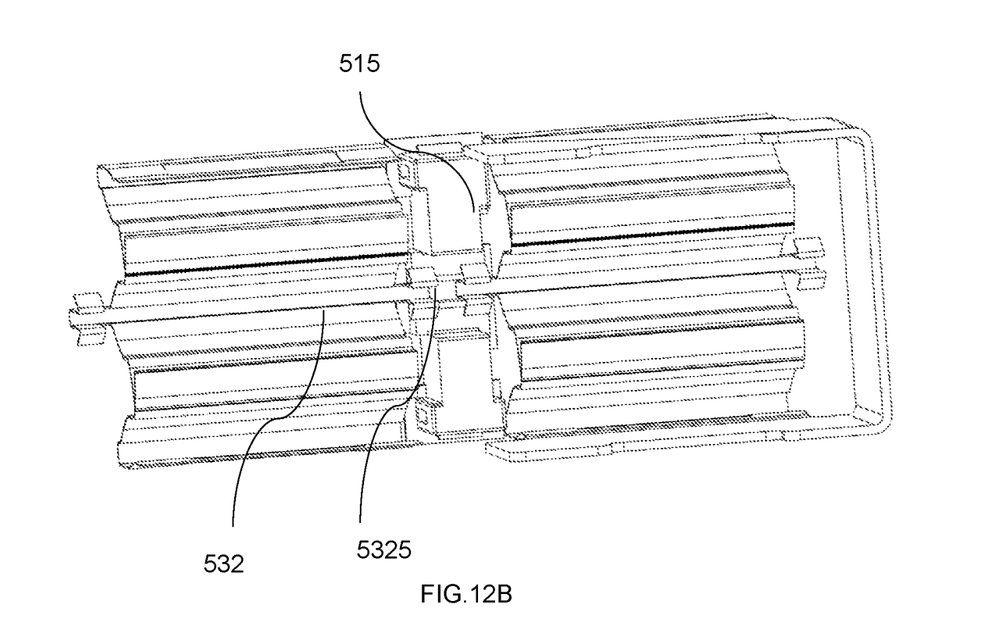
FIG. 12B is a section taken in the plane of FIG. 12A with parts of an adapter housing removed.

FIG. 12B shows a view from the interior of the adapter 50 looking toward the front of the adapter. The multiple shutters 53 may include two first shutters, two second shutters and two central shutter pairs 532. Each central shutter pair 532 may include two clips 5325 on opposite ends. Each of the clips 5325 is received in the window 516 while the other is received in the fixing member 35 such that the central shutter pair 532 is secured to the adapter housing 51.

Figure 13:
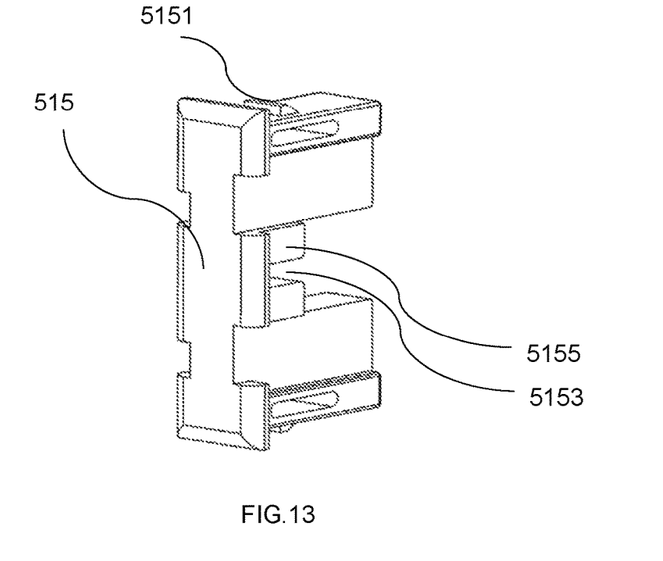
FIG. 13 is a perspective view of the fixing member of FIGS. 12A and 12B.

As shown in FIG. 13, the fixing member 515 may include a latch 5151 and a recess 5153. The latch 5151 is configured to secure the fixing member 515 to the adapter housing 51. The recess 5153 is configured to accept and secure the clip 5325 such that the movement of the clip 5325 is prevented. In this example, the clip 5325 is configured to snap into the fixing member 515. The recess 5153 may receive the main body of the clip 5325 and the movement of the wings of the clip 5325 is prevented by the stop portions 5155 arranged adjacent to the recess 5153.

Figure 14:
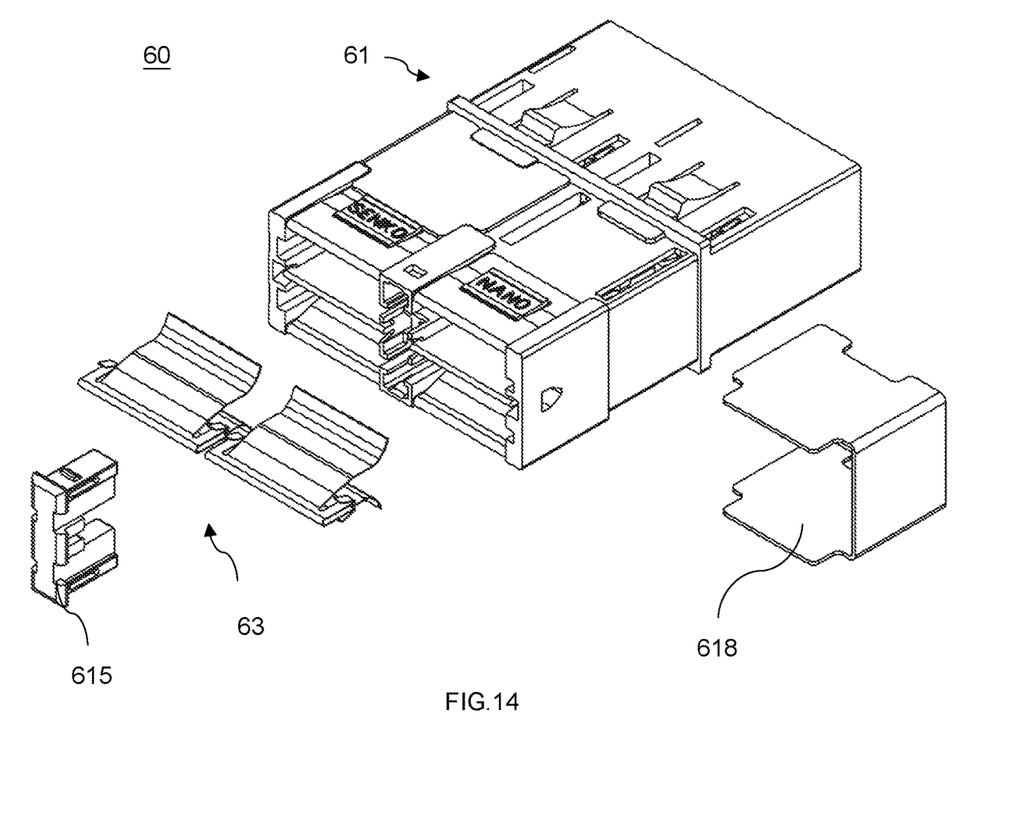
FIG. 14 is an exploded perspective view of the adapter of FIG. 12A.

With reference to FIG. 14, the adapter 60 may include an adapter housing 61 and multiple shutters 63. The multiple shutters 63 may include first and second shutters and central shutter pairs. The adapter housing 61 may also include a fixing member 615 and a frame 618. The frame 618 is configured to be stacked on a part of the first or second shutter to enhance the strength of the adapter housing 61 and improve the attachment of the first or second shutters to the adapter housing 61. In this example, the frame 618 has a shape similar to such that the frame 618 may cover three faces of the adapter housing and then protect the adapter from impact.

Those skilled in the art may understand that the adapter according to the present disclosure may include one or more channels. For example, the adapter may include two channels or four channels. Further, the adapter according to the present disclosure may be used with different types of connectors. For example, the adapter is compatible with connector including LC or MT ferrules.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera).

The invention claimed is:

1. A fiber optic adapter comprising:
    an adapter housing having two opposing sidewalls and defining a channel therebetween to receive a fiber optic connector having one or more ferrules; and
    a first shutter and a second shutter attached to opposing sidewalls of the adapter housing, each of the first and second shutters having a first member and a second member, the first member configured to extend into the channel,
    wherein the first members of the first and second shutters are sized and shaped to cooperatively close the channel, at least one of the first members being resiliently movable upon insertion of the fiber optic connector into the channel to open the channel, and each second member is configured to be secured to each of the sidewalls of the adapter housing and extend outside of the channel.

2. The fiber optic adapter according to claim 1, wherein both of the first members are resiliently movable upon insertion of the fiber optic connector into the channel to open the channel.

3. The fiber optic connector of claim 1, wherein the first members engage each other when closing the channel.

4. The fiber optic connector of claim 3, wherein the first members are of different shapes.

5. The fiber optic connector of claim 4, wherein one of the first members is longer than the other.

6. The fiber optic connector of claim 3, wherein when the channel is closed, each first member closes about one half of the channel.

7. The fiber optic adapter according to claim 1, wherein each of the first members include multiple bends defining a plurality of arc sections.

8. The fiber optic adapter according to claim 1, wherein the second member extends outside of the adapter.

9. The fiber optic adapter according to claim 1, wherein the second member is provided with a cut-out and the adapter is provided with a protrusion received in the cut-out.

10. The fiber optic adapter according to claim 1, wherein the channel constitutes a first channel, the adapter further including:
a second channel to receive another fiber optic connector, the adapter having a wall dividing the first and second channels.

11. The fiber optic adapter according to claim 10, further comprising
a central shutter pair including a first arm and second arm extending into the first channel and the second channel, respectively.

12. The fiber optic adapter according to claim 11, wherein the central shutter pair is provided with a securing element to be secured to the adapter housing.

13. The fiber optic adapter according to claim 7, wherein the shutters are made from flexible sheet metal.

14. A fiber optic adapter comprising:
an adapter housing having two opposing sidewalls and defining a channel therebetween to receive a fiber optic connector having one or more ferrules; and
a first shutter and a second shutter attached to opposing sidewalls of the adapter housing, each of the first and second shutters having a first member and a second member, the first member configured to extend into the channel,
wherein the first members of the first and second shutters are sized and shaped to cooperatively close the channel, at least one of the first members being resiliently movable upon insertion of the fiber optic connector into the channel to open the channel,
wherein the second member is provided with a cut-out and the adapter housing is provided with a protrusion received in the cut-out.

15. The fiber optic adapter according to claim 14, wherein both of the first members are resiliently movable upon insertion of the fiber optic connector into the channel to open the channel.

16. The fiber optic connector of claim 14, wherein the first members engage each other when closing the channel.

17. The fiber optic connector of claim 16, wherein the first members are of different shapes.

18. A fiber optic adapter comprising:
an adapter housing having two opposing sidewalls and defining a channel therebetween to receive a fiber optic connector having one or more ferrules; and
a first shutter and a second shutter attached to opposing sidewalls of the adapter housing, each of the first and second shutters having a first member and a second member, the first member configured to extend into the channel,
wherein the first members of the first and second shutters are sized and shaped to cooperatively close the channel, at least one of the first members is resiliently movable upon insertion of the fiber optic connector into the channel to open the channel,
wherein the channel constitutes a first channel, the adapter further includes a second channel to receive another fiber optic connector, the adapter housing has a wall dividing the first and second channels, a central shutter pair includes a first arm and second arm extending into the first channel and the second channel, respectively.

19. The fiber optic adapter according to claim 18, wherein the central shutter pair is provided with a securing element to be secured to the adapter housing.

* * * * *